United States Patent
Huang et al.

(10) Patent No.: US 10,621,466 B2
(45) Date of Patent: Apr. 14, 2020

(54) METHOD FOR EXTRACTING FEATURES OF A THERMAL IMAGE

(71) Applicant: National Chung-Shan Institute of Science and Technology, Taoyuan (TW)

(72) Inventors: Shih-Shinh Huang, Tainan (TW); Shih-Che Chien, Hsinchu (TW); Feng-Chia Chang, Taoyuan (TW); Chien-Hao Hsiao, Hsinchu (TW); Yu-Sung Hsiao, Taoyuan (TW)

(73) Assignee: National Chung-Shan Institute of Science and Technology, Taoyuan (TW)

(*) Notice: Subject to any disclaimer, the term of this patent is extended or adjusted under 35 U.S.C. 154(b) by 124 days.

(21) Appl. No.: 16/059,051

(22) Filed: Aug. 9, 2018

(65) Prior Publication Data
US 2019/0164005 A1  May 30, 2019

(30) Foreign Application Priority Data
Nov. 30, 2017 (TW) .............................. 106141948 A

(51) Int. Cl.
*G06K 9/46* (2006.01)
*G06K 9/00* (2006.01)

(52) U.S. Cl.
CPC ....... *G06K 9/4647* (2013.01); *G06K 9/00369* (2013.01); *G06K 9/00362* (2013.01)

(58) Field of Classification Search
CPC ............. G06K 9/4647; G06K 9/00389; G06K 9/00362
See application file for complete search history.

(56) References Cited

U.S. PATENT DOCUMENTS
2017/0337420 A1* 11/2017 Wang ................. G06K 9/00281
2017/0364742 A1* 12/2017 Zhang ....................... G06T 7/11

OTHER PUBLICATIONS

Hauagge, Daniel Cabrini, and Noah Snavely. "Image matching using local symmetry features." in 2012 IEEE Conference on Computer Vision and Pattern Recognition, pp. 206-213. IEEE, 2012.*
Chuang, Cheng-Hsiung, Shih-Shinh Huang, Li-Chen Fu, and Pei-Yung Hsiao. "Monocular multi-human detection using augmented histograms of oriented gradients." in 2008 19th International Conference on Pattern Recognition, pp. 1-4. IEEE, 2008.*
Dalal, N. and Triggs, B., Jun. 2005. Histograms of oriented gradients for human detection.*

* cited by examiner

*Primary Examiner* — Zhitong Chen
(74) *Attorney, Agent, or Firm* — Winston Hsu

(57) ABSTRACT

A method for extracting features of a thermal image is provided. The method includes: reading a thermal image, and dividing the thermal image into a plurality of block images; and extracting a histogram of oriented gradient (HOG) feature histogram from each of the plurality of block images, and transforming the HOG feature histogram of each of the plurality of block images into a symmetric weighting HOG (SW-HOG) feature histogram. The SW-HOG feature histogram is obtained by multiplying a histogram of gradient intensity distribution by a block weighting. The method increases weightings of blocks which cover human contours and reduces weightings of blocks of an internal region of a human appearance through analyzing thermal lightness difference of regions within blocks, to reduce the influence of clothes in the internal region and the influence of the background region.

5 Claims, 8 Drawing Sheets

METHOD FOR EXTRACTING FEATURES OF A THERMAL IMAGE

BACKGROUND OF THE INVENTION

1. Field of the Invention

The present invention is related to an image processing method, and more particularly, to a method for extracting features of a thermal image.

2. Description of the Prior Art

Image processing is a large field covering both academic and industrial applications. A popular use of this technology is image processing performed by automobiles for street monitoring and detection, where the target to be detected is a pedestrian, and the image processing application is arranged to detect pedestrians in order to inform a driver, or to activate a related safety program for determining a location of the pedestrian in order to perform a corresponding safety operation.

At night, pedestrians need to rely on street lamps, automobile headlights or illumination provided by street-side businesses in order to be seen and detected. External environmental conditions such as heavy rain or fog can make visibility poor, however, making detection of pedestrians more difficult. Although recent technology has utilized infrared detection systems for detecting pedestrians at night, most machines utilized for infrared detection are expensive, large and power-consuming, making infrared detection systems impractical and unlikely to be widely utilized.

Thermal imaging technology can receive thermal radiation emitted from respective objects in the environment. When a large amount of data is collected, different types of objects (such as pedestrians and trees) can be distinguished by observing and analyzing the data. Thermal information of thermal images obtained from a thermal imager (utilized for measuring thermal features of the objects) is relative, however, which may cause some problems. For example, same channel levels (display levels or color levels) in different thermal images may represent different temperatures. In another example, when an object having a relatively high temperature exists in a thermal image, the observable range of channel levels of objects having other temperatures may be depressed (i.e. resolution of the channel levels may be reduced), making it difficult to determine the location of pedestrians.

Common methods for thermal image detection of pedestrians identify a human appearance mainly according to textural features. For example, in a situation where a training database comprising a great number of samples of human appearance and non-human appearance is provided, a classifying apparatus may be trained to be capable of recognizing human appearance and non-human appearance through machine learning, and finally the classifying apparatus may scan the thermal image for these textural features to achieve the objective of pedestrian detection. The aforementioned methods utilizing textural features divide an image into multiple blocks, and the textural features of each of the multiple blocks are indicated by edge gradient information, lightness difference encoding statistic histograms, etc. Finally, the textural features of the multiple blocks may be connected to generate a human appearance. This method, however, may be affected by variations in the internal region of a pedestrian due to distortions (different relative lightness) in their clothes, and variations in the background region, which may reduce accuracy of the image.

Thus, a novel method for extracting features of a thermal image is needed which can prevent the influence of distortions in the internal and background regions of an image of a pedestrian, to thereby improve the accuracy of a thermal image. As a result, the objective of recognizing a pedestrian and an environment block can be achieved, and pedestrian detection ability at night can be improved.

SUMMARY OF THE INVENTION

The main objective of the present invention is to provide a method for extracting features of a thermal image in combination with a plurality of block images, a histogram of oriented gradient (HOG) feature histogram, a symmetric weighting HOG (SW-HOG) feature histogram and a block weighting.

In order to achieve the aforementioned objective, the present invention provides a method for extracting features of a thermal image. The method comprises: reading the thermal image and dividing the thermal image into a plurality of block images; and extracting a histogram of oriented gradient (HOG) feature histogram from each of the plurality of block images, and transforming the HOG feature histogram of each of the plurality of block images into a symmetric weighting HOG (SW-HOG) feature histogram. The SW-HOG feature histogram is obtained by multiplying a histogram of gradient intensity distribution by a block weighting, where the block weighting is:

$$w(B_i) = \frac{d(B_i)}{\sum_{j=1}^{9} \left( c_i^{l,t}(j) + c_i^{l,b}(j) + c_i^{r,t}(j) + c_i^{r,b}(j) \right)}$$

wherein $B_i$ represents a block image within the plurality of block images, $w(B_i)$ represents the block weighting of the block image $B_i$, $d(B_i)$ represents gradient intensity of the block image $B_i$, and $\{c_i^{l,t}(j), c_i^{l,b}(j), c_i^{r,t}(j), c_i^{r,b}(j)\}$ represent intensity of a top-left corner cell image, a bottom-left corner cell image, a top-right corner cell image and a bottom-right corner cell image, respectively.

A HOG feature is a feature descriptor for image processing to detect pedestrians or objects, and a HOG feature histogram is an expression indicating the HOG feature. When the HOG feature of a test sample graph is extracted, the graph (or block image) needs to be divided into small cell images (which may be referred to as cells for brevity), and the method collects histograms of oriented gradient/edge of respective pixel points within cells to further combine the histograms of oriented gradient/edge in order to form the HOG feature of the test sample graph. For example, the gradient of a pixel point (x,y) within a graph comprises:

$$Gx(x,y)=H(x+1,y)-H(x-1,y); \text{ and}$$

$$Gy(x,y)=H(x,y+1)-H(x,y-1);$$

where $Gx(x,y)$, $Gy(x,y)$ and $H(x,y)$ may represent the horizontal oriented gradient, vertical oriented gradient and pixel value of the pixel point (x,y).

In the present invention, a block image may be divided into four cell images, but the present invention is not limited thereto. A HOG feature histogram extracted from each of the cell images is a histogram of gradient intensity distribution, where the histogram of gradient intensity distribution is obtained by calculating a histogram of horizontal gradient intensity distribution and a histogram of vertical gradient intensity distribution. In the present invention, an SW-HOG feature histogram is obtained by multiplying the aforementioned histogram of gradient intensity distribution by a block weighting, and a magnitude of the block weighting is adjusted according to symmetry of the aforementioned HOG feature histogram, wherein the block weighting is:

$$w(B_i) = \frac{d(B_i)}{\sum_{j=1}^{9} \left( c_i^{l,t}(j) + c_i^{l,b}(j) + c_i^{r,t}(j) + c_i^{r,b}(j) \right)}$$

wherein $B_i$ represents a block image within the plurality of block images, $w(B_i)$ represents the block weighting of the block image $B_i$, $d(B_i)$ represents gradient intensity of the block image $B_i$, and $\{c_i^{l,t}(j), c_i^{l,b}(j), c_i^{r,t}(j), c_i^{r,b}(j)\}$ represent intensity of a top-left corner cell image, a bottom-left corner cell image, a top-right corner cell image and a bottom-right corner cell image, respectively.

The above summary and the following detailed description and accompanying drawings are for further illustrating features of the present invention and the effects thereby achieved. Further objectives and advantages of the present invention will be provided in the subsequent description and the accompanying drawings.

These and other objectives of the present invention will no doubt become obvious to those of ordinary skill in the art after reading the following detailed description of the preferred embodiment that is illustrated in the various figures and drawings.

DETAILED DESCRIPTION

Embodiments are provided to describe the method of the present invention. Those skilled in the art may understand the advantages and effects of the present invention according to the detailed description, which is provided as follows.

The main concept of histogram of oriented gradient (HOG) feature extraction is to connect all block images according to same weightings. Although related art methods may effectively indicate human appearance features, performance of the method may be affected by different lightness within an internal region of a pedestrian due to clothes, and within the background region of an image. In order to solve the aforementioned problems to improve discriminability of commonly used textural features, the present invention provides a method, which increases the weightings of block images comprising human contours and reduces the weightings of block images of the internal region of a human appearance through analyzing thermal lightness differences between regions within block images, to reduce the influence of the aforementioned factors.

Figure 1:
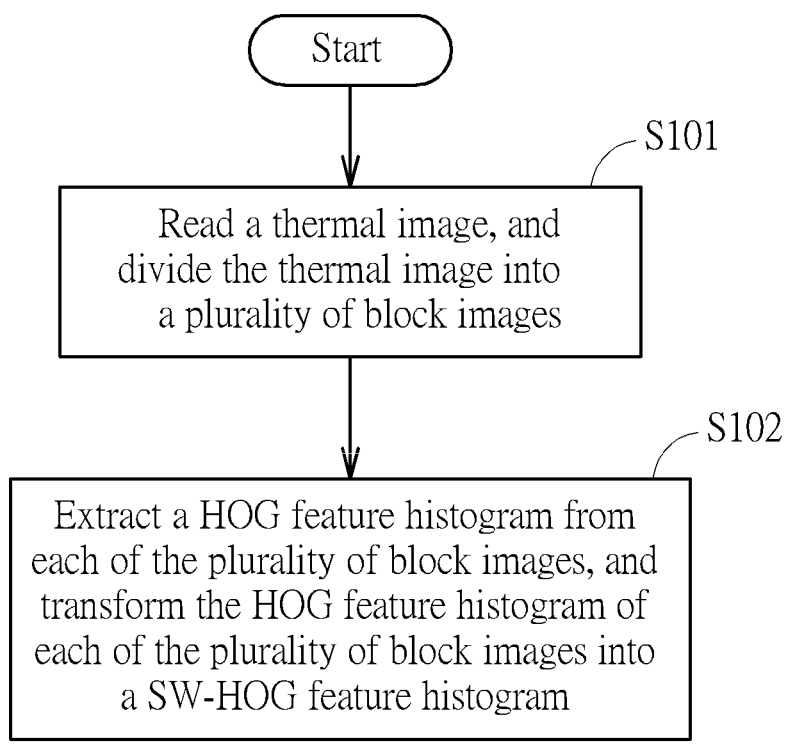
FIG. 1 is a flowchart illustrating a method for extracting features of a thermal image according to an embodiment of the present invention.

Refer to FIG. 1, which is a flowchart illustrating the method for extracting features of a thermal image according to an embodiment of the present invention. As shown in FIG. 1, the method comprises the following steps: In Step S101, the method may read the thermal image, and divide the thermal image into a plurality of block images; and in Step S102, the method may extract a HOG feature histogram from each of the plurality of block images, and transform the HOG feature histograms of each of the plurality of block images into a symmetric weighting HOG (SW-HOG) feature histogram. The SW-HOG feature histogram may be obtained by multiplying a histogram of gradient intensity distribution by a block weighting, where the block weighting is:

$$w(B_i) = \frac{d(B_i)}{\sum_{j=1}^{9} \left( c_i^{l,t}(j) + c_i^{l,b}(j) + c_i^{r,t}(j) + c_i^{r,b}(j) \right)}$$

where $B_i$ may represent a block image within the plurality of block images, $w(B_i)$ may represent the block weighting of the block image $B_i$, $d(B_i)$ may represent gradient intensity of the block image $B_i$, and $\{c_i^{l,t}(j), c_i^{l,b}(j), c_i^{r,t}(j), c_i^{r,b}(j)\}$ may represent intensity of a top-left corner cell image, a bottom-left corner cell image, a top-right corner cell image and a bottom-right corner cell image, respectively.

Figure 2:
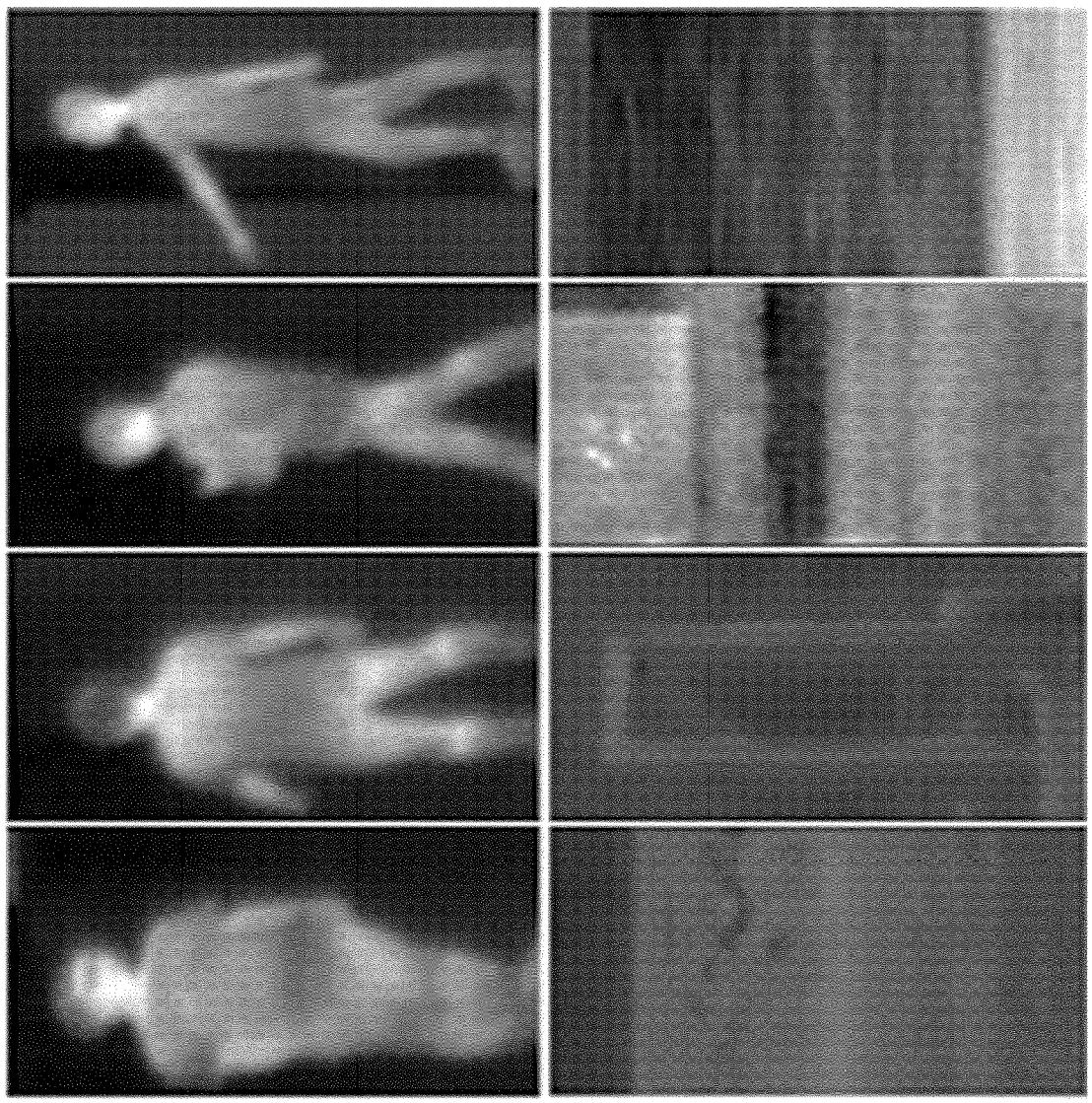
FIG. 2 is a diagram illustrating thermal images of human appearance and non-human appearance.

Refer to FIG. 2, which is a diagram illustrating thermal images of human appearance and non-human appearance. As shown in FIG. 2, in comparison with thermal (radiation) images (block images) of non-human appearance, channel levels (lightness intensity) of a thermal image of human appearance may be relatively irregular. The reason is that the temperature of a pedestrian (or any human body) is higher than the temperature of a background scene; additionally, there may be different clothes covering respective portions of a human. Since temperatures in a scene are normally distributed in the thermal image of the non-human appearance, channel levels thereof may be relatively regular. The reason is that the background scene is usually far from a thermal image sensor, so that the thermal energy of all objects within the background scene may equally decay with distance, and the lightness of the background thermal image may therefore be uniform.

Figure 3:
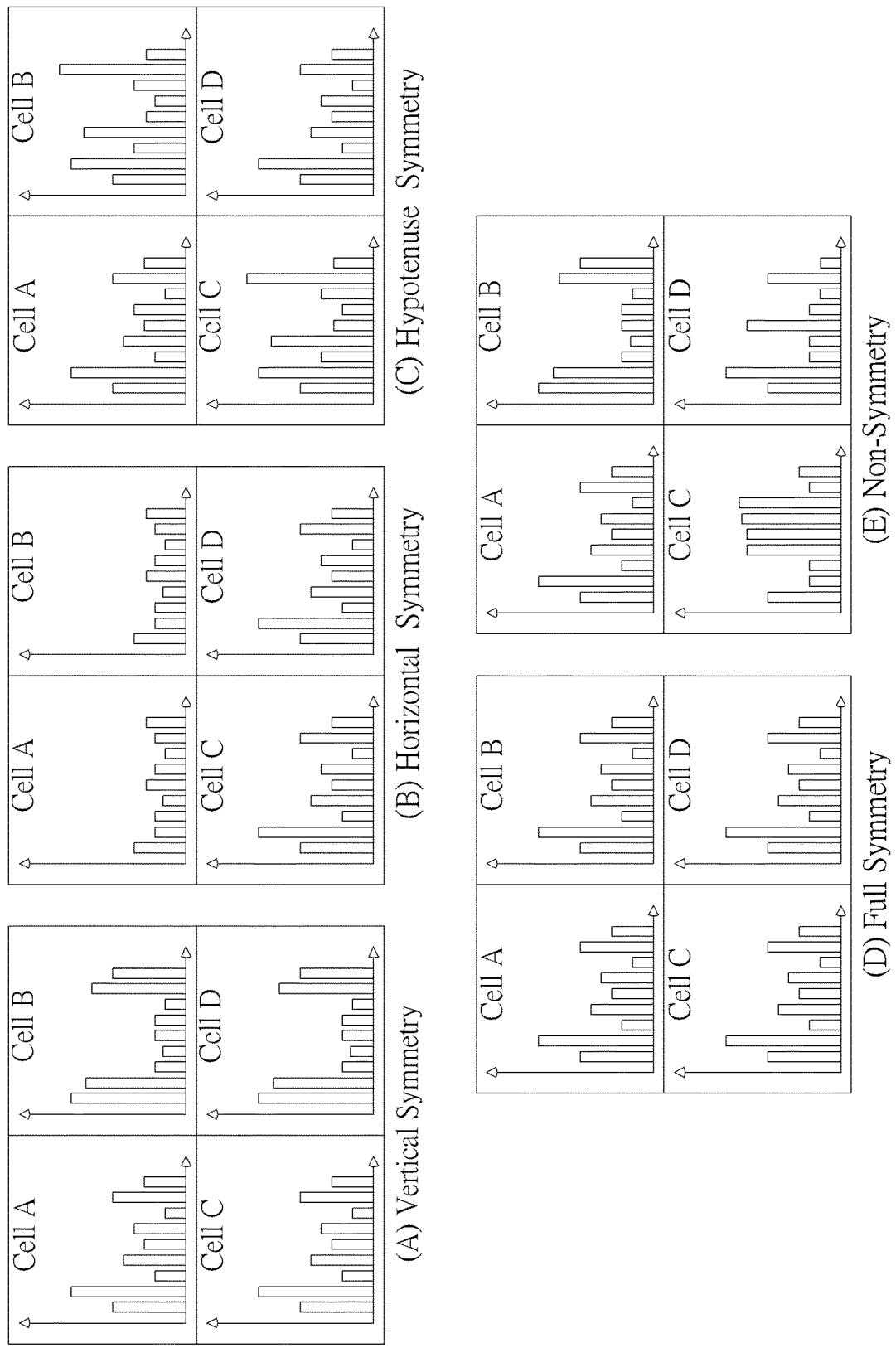
FIG. 3 is a diagram illustrating symmetry analysis according to an embodiment of the present invention.
Figure 4:
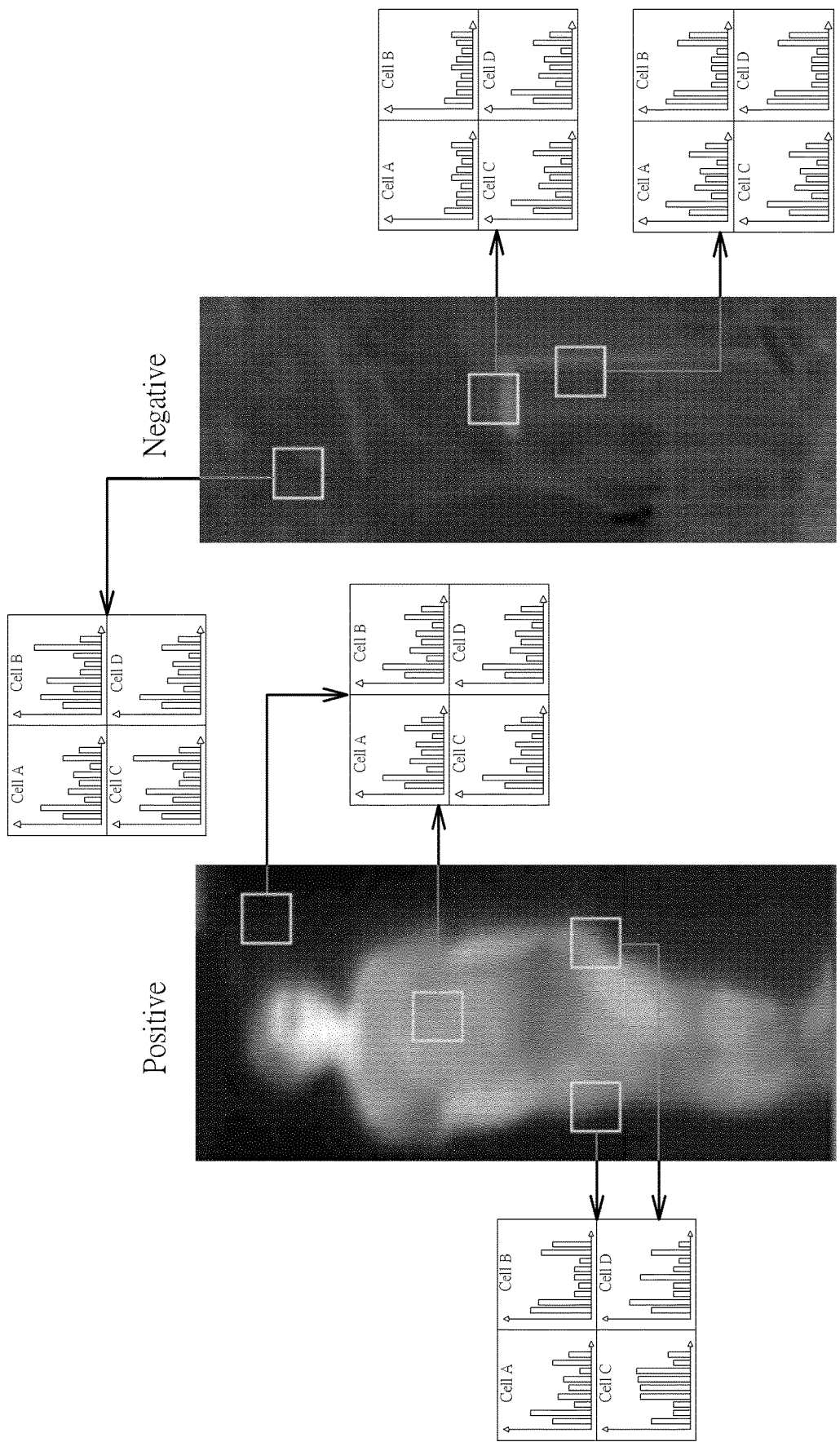
FIG. 4 is a diagram illustrating symmetry distribution of histograms of a pedestrian and background.

Refer to FIG. 3 and FIG. 4, where FIG. 3 is a diagram illustrating symmetry analysis according to an embodiment of the present invention, and FIG. 4 is a diagram illustrating symmetry distribution of histograms in thermal images of a pedestrian and the background. As shown in FIG. 3, in order to effectively analyze the aforementioned behavior, the method of the present invention may analyze gradient intensity distribution (i.e. the HOG feature histograms) of the four cell images within respective block images regarding the block image of the thermal image. As shown in sub-diagram (A) of FIG. 3, when histograms of the upper-half (i.e. cells A and B) and the lower-half (i.e. cells C and D) of the block are quite similar, this may indicate Vertical Symmetry; as shown in sub-diagram (B) of FIG. 3, when histograms of the left-half (i.e. cells A and C) and the right-half (i.e. cells B and D) of the block are quite similar, this may indicate Horizontal Symmetry; as shown in the sub-diagram (C) of FIG. 3, when histograms of the top-right corner (i.e. cell B) and the bottom-left corner (i.e. cell C) or the top-left corner (i.e. cell A) and the bottom-right corner (i.e. cell D)) of the block are quite similar, this may indicate Hypotenuse Symmetry; as shown in sub-diagram (D) of FIG. 3, when histograms of all cells of the block are quite similar, this may indicate Full Symmetry; and as shown in sub-diagram (E) of FIG. 3, when histograms of four cells of the block are not similar at all, this may indicate Non-Symmetry.

As shown in FIG. 4, the histograms of the aforementioned symmetry may be distributed in a human appearance template (which may be referred to as a positive template) and a non-human appearance template (which may be referred to as a negative template). As shown in FIG. 4, there may be more Full Symmetry results in the internal region of the human appearance or in the surrounding background region thereof, and there may be more Non-Symmetry results at the edge of the human appearance. Additionally, since the scene without human appearance is more monotonous, there may be more Vertical Symmetry results, Horizontal Symmetry results and Hypotenuse Symmetry results in the non-human appearance template. Thus, the method analyzes the importance of feature expressions of respective block images according to symmetry features of histograms of the four cell images within a block image (which may be referred to as a block, for brevity). When a block is located at a contour edge of the human appearance (which indicates Non-Symmetry), importance of the feature expression of the block may be enhanced; otherwise, when the block is located in the internal region of the human appearance or in the background region (which indicates Horizontal Symmetry or Vertical Symmetry), the importance of the feature expression of the block may be reduced, to thereby reduce influence of the thermal energy difference between the internal region of the human appearance and the background object. The accuracy of the features can be effectively improved.

In an embodiment, the method of the present invention analyzes 4,224 thermal images of human appearance (e.g. positive templates) therein and 4,200 thermal images of non-human appearance (e.g. negative templates). The resolution of each of the templates is 64×128 and the size of a block is set to be 16×16. The strides of movement of each block from top-left to bottom in both horizontal and vertical directions are 8 pixels. Regarding four cells within a block image $B_i$, symbols $\{c_i^{l,t}, c_i^{l,b}, c_i^{r,t}, c_i^{r,b}\}$ represent a top-left corner cell, a bottom-left corner cell, a top-right corner cell and a bottom-right corner cell, respectively, where the symbol "i" is a positive integer. Definitions of histograms of horizontal gradient intensity $d_h(B_i)$ and vertical gradient intensity $d_v(B_i)$ are:

$$d_h(B_i)=\Sigma_{j=1}^{9}(c_i^{l,t}(j)+c_i^{r,t}(j))+\Sigma_{j=1}^{9}(c_i^{l,b}(j)+c_i^{r,b}(j))$$

$$d_v(B_i)=\Sigma_{j=1}^{9}(c_i^{l,t}(j)-c_i^{l,b}(j))+\Sigma_{j=1}^{9}(c_i^{r,t}(j)-c_i^{r,b}(j))$$

where $\{c_i^{l,t}(j), c_i^{l,b}(j), c_i^{r,t}(j), c_i^{r,b}(j)\}$ may represent the $j^{th}$ bin of the top-left corner cell, the bottom-left corner cell, the top-right corner cell and the bottom-right corner cell, respectively, and histograms of cell gradient intensity within the block $B_i$ is defined as:

$$d(B_i)=d_h(B_i)+d_v(B_i)$$

Figure 5:
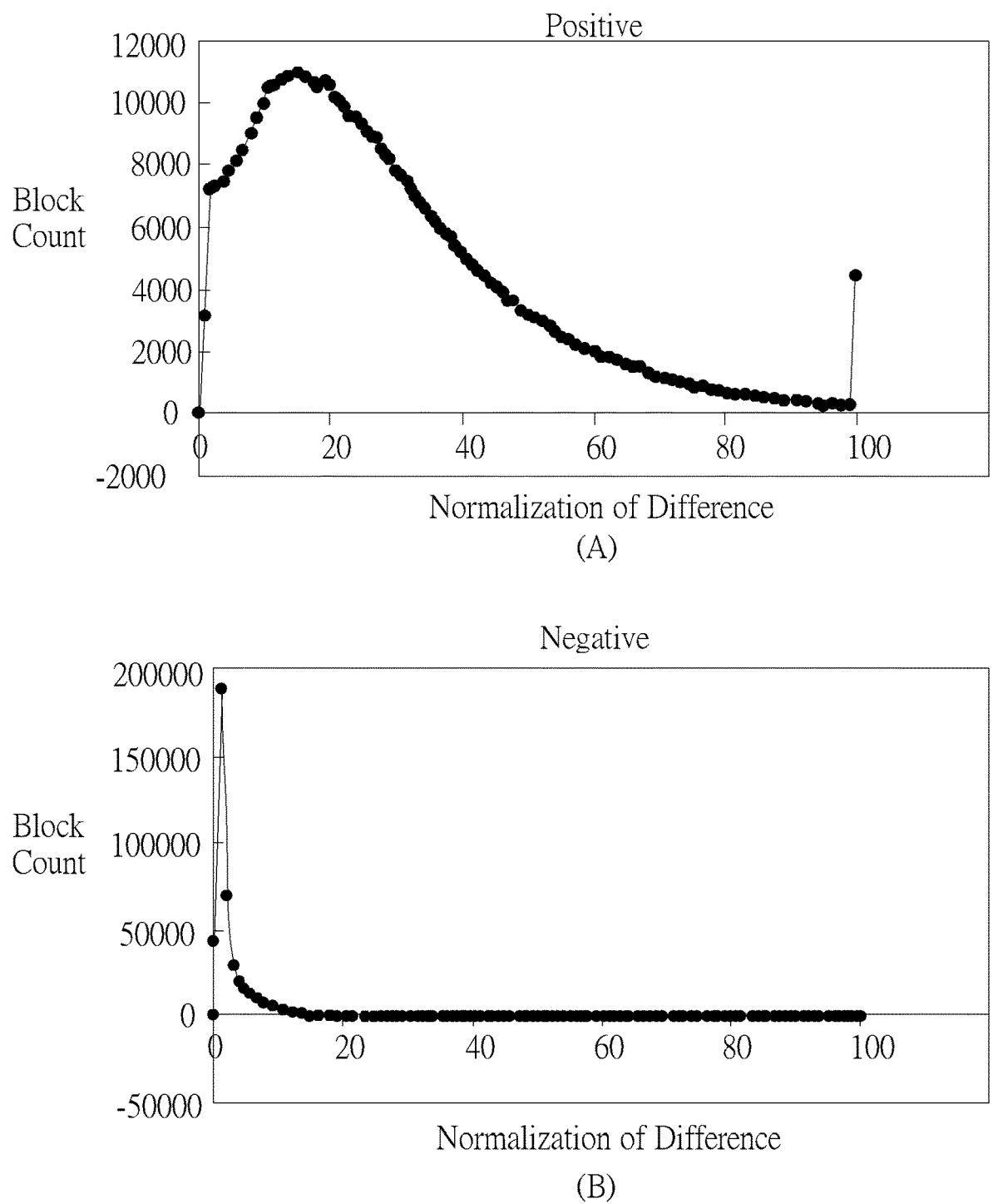
FIG. 5 illustrates statistical diagrams of histograms showing the differences in intensity of templates of human appearance and non-human appearance.

Refer to FIG. 5, which illustrates statistical diagrams of histograms showing the differences in intensity of templates of human appearance and non-human appearance. As shown in FIG. 5, after analyzing 4,224 templates (or images) of human appearance (as illustrated in sub-diagram (A) of FIG. 5) and 4,200 templates (or images) of non-human appearance (as illustrated in sub-diagram (B) of FIG. 5), in this embodiment, the vertical axis indicates statistic counts of blocks (which may be referred to as block count), and the horizontal axis indicates difference values which are normalized to the interval [0,100] (which may be referred to as normalization of difference), in order to describe the aforementioned histogram difference of a template of human appearance. It may be observed from the analysis result that difference levels of the template of human appearance (referred to as a positive template in FIG. 5) are greater and distributed more widely in comparison with the template of non-human appearance (referred to as a negative template in FIG. 5), where most of the difference levels of the non-human appearance template are less than 10. Obviously, these features can effectively discriminate templates (thermal images) of human appearance and non-human appearance; thus, according to the value of $d(B_i)$, the block weighting of the block $B_i$ may be calculated as follows:

$$w(B_i) = \frac{d(B_i)}{\sum_{j=1}^{9}(c_i^{l,t}(j)+c_i^{l,b}(j)+c_i^{r,t}(j)+c_i^{r,b}(j))}$$

and the method may further utilize block weightings obtained by the above calculations to re-adjust histograms of HOG gradient intensity distribution of respective block images, in order to transform the histograms of HOG gradient intensity distribution into SW-HOG feature histograms, where the adjustment equation is shown as follows:

$$SW\text{-}HOG(B_i)=w(B_i)\times HOG(B_i)$$

where SW-HOG($B_i$) represents a SW-HOG feature histogram of the block $B_i$, and HOG($B_i$) represents a histogram of HOG gradient intensity distribution of the block $B_i$.

Figure 6:
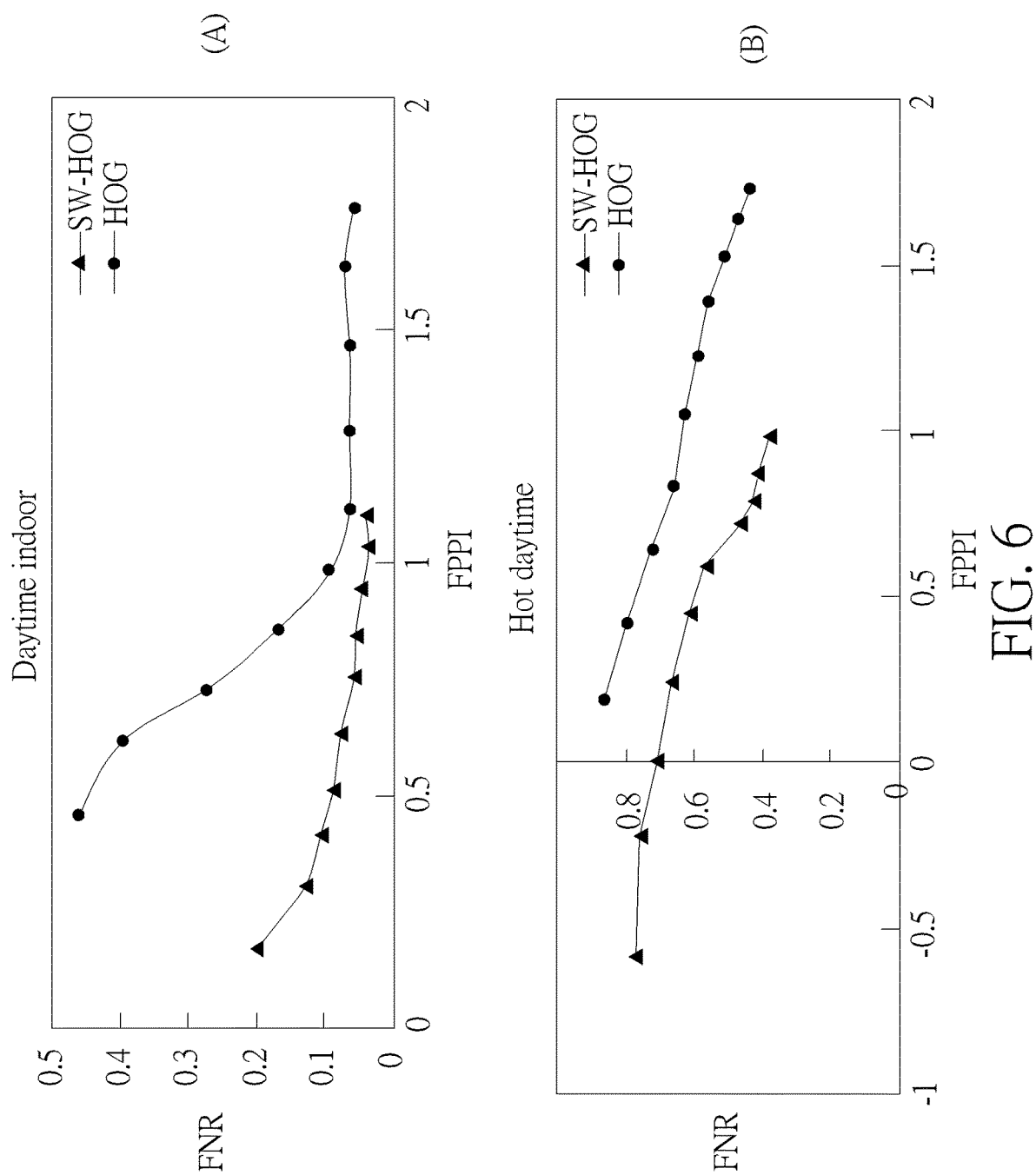
FIGS. 6-8 illustrate comparison results of performance between SW-HOG of the present invention and HOG.
Figure 7:
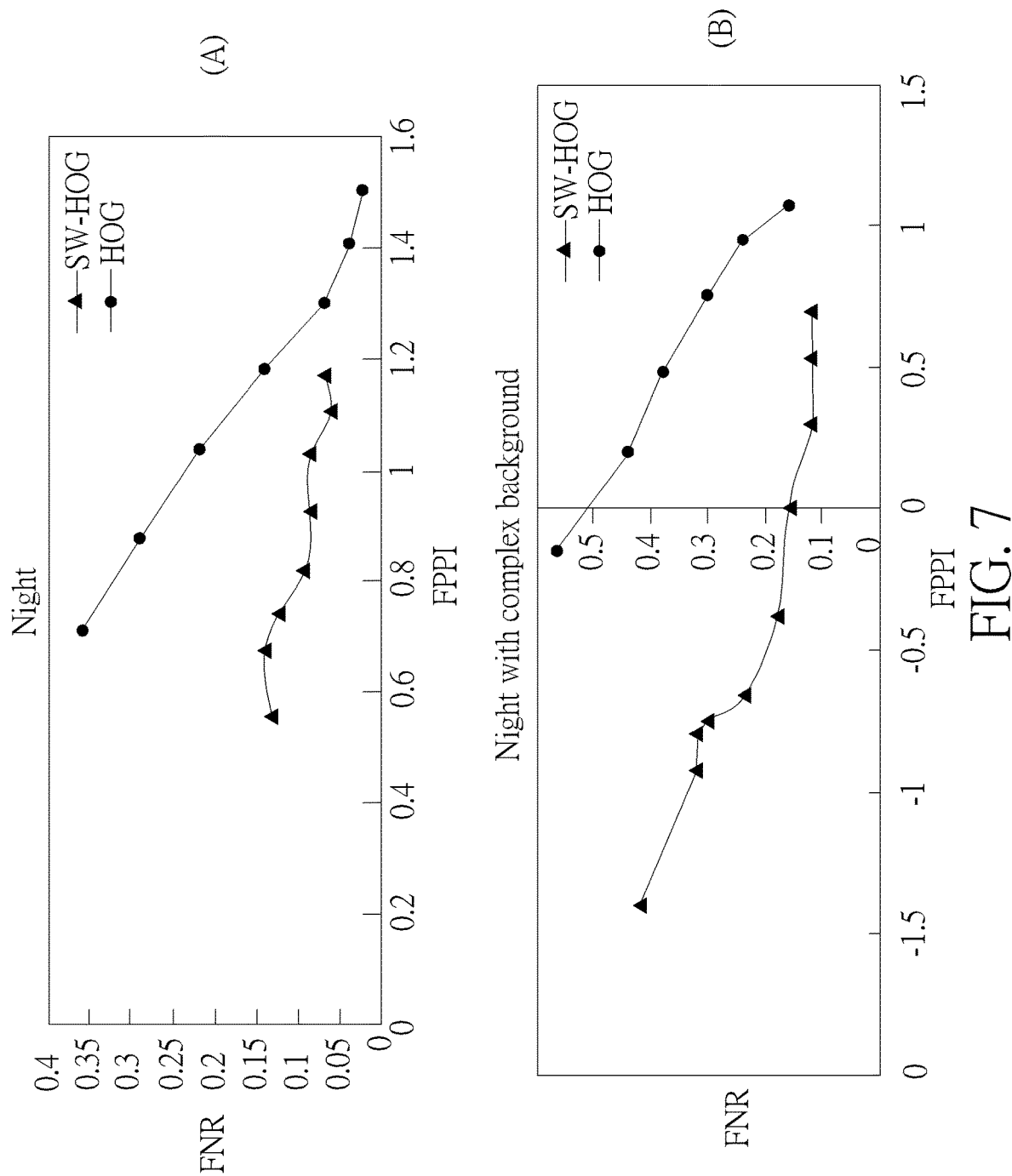
Figure 8:
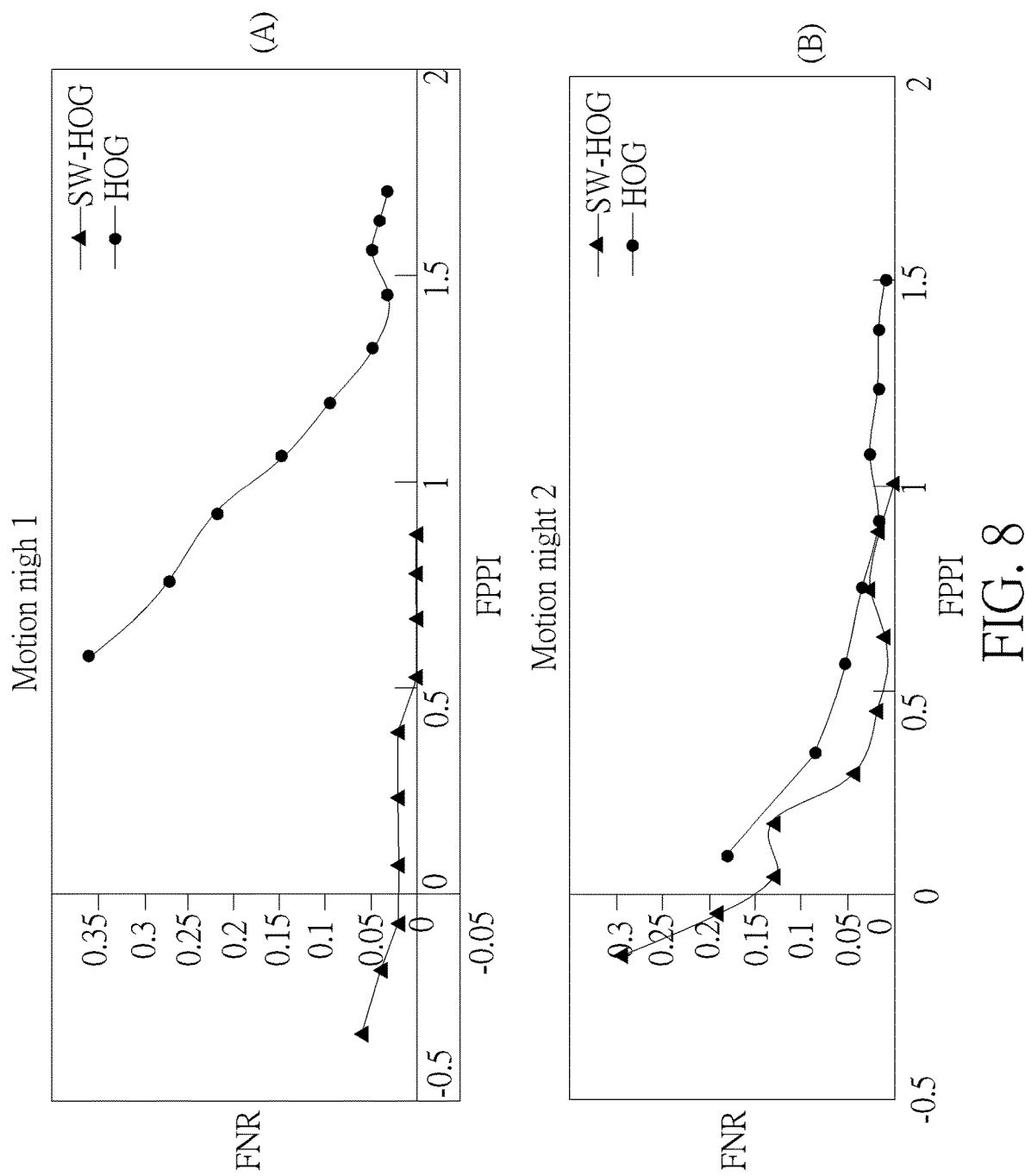

Refer to FIGS. 6-8, which illustrate comparison results of performance between SW-HOG of the present invention and HOG, where the horizontal axis of diagrams in FIGS. 6-8 represents false positive per image (FPPI), and the vertical axis of the diagrams in FIGS. 6-8 represents false negative rate (FNR). Please note that, in FIGS. 6-8, the lines with triangles thereon indicate SW-HOG results, and the lines with circles thereon indicate HOG results. In this embodiment, six scenarios are analyzed. More particularly, daytime indoor and hot daytime conditions are shown in sub-diagrams (A) and (B) of FIG. 6, respectively, night and night with complex background conditions are shown in sub-diagrams (A) and (B) of FIG. 7, respectively, and two motion night conditions (which may be referred to as motion night 1 and motion night 2, respectively) are shown in sub-diagrams (A) and (B) of FIG. 8, respectively. In addition, each of the six scenarios comprises 50 consecutive thermal images. Comparing the performance of conventional HOG features with the enhanced HOG features, it is obvious that detection performance can be greatly improved after the difference between the human-appearance and the background is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for extracting features of a thermal image, comprising: reading the thermal image, and dividing the thermal image into a plurality of block images; and extracting a histogram of oriented gradient (HOG) feature histogram from each of the plurality of block images, and transforming the HOG feature histogram of each of the plurality of block images into a symmetric weighting HOG (SW-HOG) feature histogram; wherein the SW-HOG feature histogram is obtained by multiplying a histogram of gradient intensity distribution by a block weighting, and the block weighting is:

$$w(B_i) = \frac{d(B_i)}{\sum_{j=1}^{9}(c_i^{l,t}(j) + c_i^{l,b}(j) + c_i^{r,t}(j) + c_i^{r,b}(j))}$$

wherein $B_i$ represents a block image within the plurality of block images, $w(B_i)$ represents the block weighting of the block image $B_i$, $d(B_i)$ represents gradient intensity of the block image $B_i$, and $\{c_i^{l,t}(j), c_i^{l,b}(j), c_i^{r,t}(j), c_i^{r,b}(j)\}$ represent the $j^{th}$ bin of intensity of a top-left corner cell image, a bottom-left corner cell image, a top-right corner cell image and a bottom-right corner cell image, respectively.

2. The method of claim 1, wherein each of the plurality of block images is divided into four cell images.

3. The method of claim 1, wherein the HOG feature histogram is the histogram of gradient intensity distribution.

4. The method of claim 3, wherein the histogram of gradient intensity distribution is obtained by calculating a histogram of horizontal gradient intensity distribution and a histogram of vertical gradient intensity distribution.

5. The method of claim 1, wherein a magnitude of the block weighting is adjusted according to symmetry of the HOG feature histogram.

* * * * *